United States Patent [19]

Bachhofer et al.

[11] Patent Number: 5,466,374

[45] Date of Patent: Nov. 14, 1995

[54] PROCESS FOR TREATING ORGANICALLY POLLUTED WATER

[76] Inventors: Bruno Bachhofer, Saentisstrasse 85, 88213 Ravensburg; Anton Locher, Bergstrasse 6, 88214 Ravensburg, both of Germany

[21] Appl. No.: 280,830

[22] Filed: Jul. 26, 1994

[30] Foreign Application Priority Data

Jul. 31, 1993 [DE] Germany .................... 43 25 803.4

[51] Int. Cl.⁶ ................................. C02F 9/00; C02F 1/78
[52] U.S. Cl. ........................ 210/610; 210/617; 210/631; 210/760
[58] Field of Search ................................. 210/760, 752, 210/610, 615, 616, 617, 631

[56] References Cited

U.S. PATENT DOCUMENTS

| | | |
|---|---|---|
| 3,935,100 | 1/1976 | Alagy et al. . |
| 4,053,394 | 10/1977 | Fisk ........................... 210/622 |
| 4,332,687 | 6/1982 | Daignault et al. . |
| 4,584,107 | 4/1986 | Odaka et al. .............. 210/760 |
| 4,780,215 | 10/1988 | Carlson . |
| 4,798,669 | 1/1989 | Bachhofer et al. ........ 210/760 |
| 4,911,843 | 3/1990 | Hunniford et al. ....... 210/610 |
| 5,269,929 | 12/1993 | Sublette et al. ........... 210/610 |
| 5,336,413 | 8/1994 | van Staveren ............ 210/760 |

FOREIGN PATENT DOCUMENTS

| | | |
|---|---|---|
| 2455002 | 11/1980 | France .................... 210/615 |
| 2740768 | 3/1978 | Germany . |
| 233825 | 3/1986 | Germany . |
| 4000292 | 7/1991 | Germany ................ 210/615 |
| 4024529 | 2/1992 | Germany . |
| 55106597 | 8/1980 | Japan ...................... 210/615 |
| 59189997 | 10/1984 | Japan ...................... 210/616 |
| 4197498 | 7/1992 | Japan . |
| 1551658 | 3/1990 | U.S.S.R. . |

OTHER PUBLICATIONS

Chemical Abstracts: Ref. 100: 12401c, vol. 100, 1984.
Ursula Obst, et al., *Biotechnologie in der Wasserauf–bereitung*, R. Oldenbourgh Verlag Müchen, Wien (1990), pp. 92–95.
Chemical Abstracts: Ref. 110: 215329q, vol. 110, 1989. Ref. 106: 182382p, vol. 106, 1987. Ref. 100:12401c, vol. 100, 1984. Ref. 97: 28367b, vol. 97, 1982.
M. Schwartz et al.: A Study of the Feasibility to Achieve Resusadle Water by Ozonation–Biological Activated Carbon Technology. In: Water Reuse Symposium: Proceedings, 2, 1981, pp. 1184–1218.

Primary Examiner—Peter A. Hruskoci
Assistant Examiner—Theodore M. Green
Attorney, Agent, or Firm—Spencer, Frank & Schneider

[57] ABSTRACT

A process for purifying organically polluted water containing organic nutrients for microorganisms, the process including (a) mixing the organically polluted water intensively with ozone in an ozone treatment unit; (b) adding to the water of step (a) at least one compound containing sulfur, which at least one compound containing sulfur is bioavailable for assimilation by at least aerobic microorganisms; and (c) passing the water of step (b) through a filter composed of a plurality of different layers. The process may optionally include treating the water after step (c) with ozone in an ozone water treatment unit in order to oxidize residual bioavailable sulfur. The at least one compound containing sulfur is preferably added in an amount which is effective to at least eliminate sulfur deficiency of the aerobic microorganisms and promote growth of a biofilm in the filter thereby contributing to biological mineralization of the organic nutrients.

8 Claims, 1 Drawing Sheet

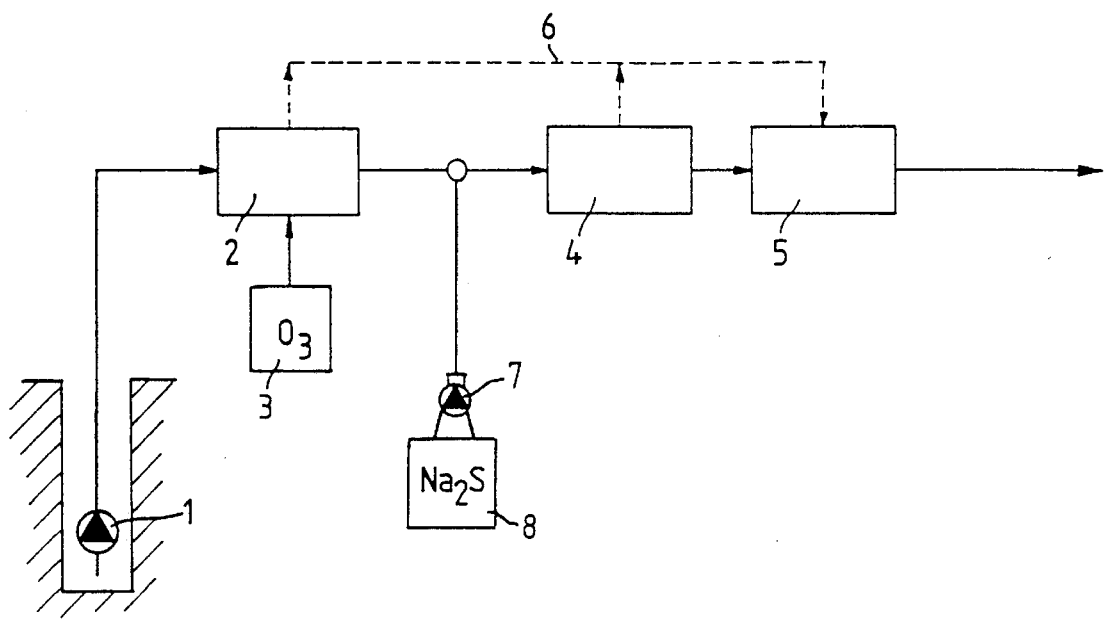

PROCESS FOR TREATING ORGANICALLY POLLUTED WATER

BACKGROUND OF THE INVENTION

1. Field of the Invention

The invention relates to a process for treating organically polluted water, e.g., for the purpose of producing drinking water, the raw water being intensively mixed in an ozone treatment unit with ozone and then being passed through a filter (fixed-bed reactor) built up from different layers.

2. Description of the Related Art

Generally, the aim of drinking water treatment is not only to remove as completely as possible from the water the loading of concern for human consumption, i.e. contaminants, bacteria etc., but also all those constituents which are considered as nutrients for microorganisms. There is the risk of microorganisms establishing themselves in the distribution network, in particular in branch lines with light flows, and constuning the existing oxygen through respiration during assimilation of these nutrient still remaining in the water. As a hygienic measure, chlorine is conventionally added to the water in order to reduce the bacterial growth. The slogan must therefore be: "Hygiene by nutrient removal". In this manner, the amount of chlorine required can be decreased.

In the process of the Generic type, by no means all of the organic water constituents are completely mineralized by the action of ozone. High-molecular weight compounds are rather only broken down to give smaller units, since at present, the water resources, apart from the natural substances, also contain to an increasing extent anthropogenic high-molecular weight organic substances which in any case are decomposed by the ozone treatment to give low-molecular weight compounds. These constituents thus become nutrients for the bacteria, i.e., assimilable organic substances promoting bacterial growth.

In the process of the generic type, it is further assumed that a multi-layer filter designed as a "fixedbed reactor" is provided downstream of the ozone treatment unit. Such a filter is preferably provided with an upper coarse filter layer comprising filtering charcoal and a fine sand layer beneath this. The filtering charcoal (activated charcoal) primarily has the task of eliminating the residual ozone dissolved in the water, in part by wall catalysis, in part by formation of $CO_2$. Overall, on the one hand, the filter has a mechanical screening action and on the other hand, however, adsorptive and other boundary-layer processes, chemical reactions and marked biological processes also proceed in the filter. It is known that a more or less thick film, specific to water, of heterotrophic microorganisms, more precisely of the aerobic type, forms on the surface of the filter grains. In the oxygen-rich environment, these microorganisms contribute to further elimination of dissolved nutrients. These are generally communities of various organisms which together form a symbiosis.

The present studies therefore clearly show that even rapid filters having a gravel packing, despite the high filter rates, represent filters working biologically to a greater or lesser extent, the colonization (density) of which probably depends on the raw water quality (Obst/Alexander/Mevius, "Biotechnologie in der Wasseraufbereitung", (Biotechnology in water treatment), R. Olderibourg Verlag Munich Vienna 1990 ISBN 3-486-26104-5, page 95).

The object underlying the invention is to optimize the biological mineralization in the process of the generic type.

In this context, the abovementioned publication, page 85, discloses that, even in nutrient-rich water, the growth of biofilms is limited by the supply of oxygen and organic carbon, the oxygen being the first limiting factor. However, in the process of the generic type, as a result of the intensive ozone treatment in the filter region, sufficient molecular oxygen is present and the nutrient supply, owing to the pretreatment with ozone, is also extensive. Nevertheless, inadequate bacterial growth is frequently observed.

BRIEF DESCRIPTION OF THE DRAWING

The sole drawing figure schematically shows the process according to the invention.

SUMMARY OF THE INVENTION

According to the invention, the object is achieved by providing a process for treating organically polluted water, e.g., for the purpose of producing drinking water, the raw water being intensively mixed in an ozone treatment unit with ozone and then being passed through a filter (fixed-bed reactor) built up from different layers, which comprises adding, between the ozone treatment unit (2) and the filter (4) sulfur in the form of a compound available for assimilation by microorganisms, e.g., in the form of a sulfide. Underlying this is the knowledge that the microorganisms participating in the water treatment, like other forms of life, are also built up from a limited set of small organic molecules which comprise a few main elements, among which sulfur plays an important role. Although sulfur is generally present in water, as a result of the ozone treatment and the oxygen-rich filter environment, it is only present in a highly oxidized form as sulfate which is not available to the aerobic microorganisms. If sulfur is therefore added in a bioavailable form downstream, in the direction of flow, of the ozone treatment unit, this decisive sulfur deficiency of the microorganisms is eliminated with the consequence that the growth of the biofilm is promoted and thus the purification action of the biomass is considerably increased.

Sulfur is only bioavailable in reduced compounds. Among the sulfides, sodium sulfide has proved to be particularly suitable. It dissolves readily in water and can therefore be reliably metered by means of a metering pump of known technology. However, other suitable compounds are hydrogen sulfide, sodium sulfite or sodium thiosulfate.

Finally, it is proposed that an ozone treatment of the water takes place which concludes the process with respect to time and space. The ozone addition at this point forces the oxidation of any residues possibly still present of assimilable less-oxidized sulfur, e.g. sulfide, to sulfate.

DESCRIPTION OF THE PREFERRED EMBODIMENTS

An exemplary embodiment of the process according to the invention is described with reference to a diagrammatic representation.

A feed pump 1 arranged in a well transports raw water into a drinking water distribution network via the drinking water treatment plant shown. The water is first intensively mixed in an ozone treatment unit 2 with ozone which is produced in an ozone generator 3. After the ozone treatment, a sodium sulfide solution stored in a vessel 8 is added to the water by means of a metering pump 7. The water then flows through a filter vessel 4 which is provided with a plurality of filter layers and a permeable base, a community of microorganisms having established itself in the filter, which community participates significantly in the further mineralization of the constituents still contained in the water. Finally, the water further runs through a concluding treatment unit 5 in which the water is mixed with a residual ozone and air mixture produced from the ozone treatment unit 2 and the filter vessel 4 via the lines 6.

What is claimed is:

1. A process for purifying organically polluted water containing organic nutrients for microorganisms, the process comprising:

a. mixing the organically polluted water intensively with ozone in an ozone treatment unit;

b. adding to the water of step (a) at least one compound containing sulfur which is selected from the group consisting of hydrogen sulfide, sodium sulfite, and sodium thiosulfate, which is bioavailable for assimilation by aerobic mircoorganisms, and which is added in an amount which is effective to at least eliminate sulfur deficiency o the aerobic microorganisms and promote growth of a biofilm in a filter; and c. passing the water of step (b) through a filter comprised of a plurality of different layer, wherein a biofilm of the aerobic microorganisms develops in the filter and contributes to biological mineralization of the organic nutrients.

2. The process according to claim 1, wherein the at least one compound containing sulfur is a sulfide.

3. The process according to claim 1, wherein the at least one compound containing sulfur is sodium sulfide and is added as an aqueous solution thereof.

4. The process according to claim 1, further comprising treating the water after step (c) with ozone in an ozone water treatment unit in order to oxidize residual bioavailable sulfur.

5. The process according to claim 4, wherein the bioavailable sulfur is present as a sulfide, and wherein treating the water after step (c) with ozone in an ozone water treatment unit oxidizes the sulfide to a sulfate.

6. The process according to claim 1, wherein the plurality of different layers of the filter includes an upper coarse filter layer composed of filtering charcoal and a layer composed of fine sand positioned beneath the upper coarse filter layer.

7. The process according to claim 1, wherein the filter is a fixed-bed reactor.

8. The process according to claim 1, wherein the organically polluted water is treated to provide water having a purity which is at least sufficient for use as drinking water.

\* \* \* \* \*